United States Patent
Ye et al.

(10) Patent No.: US 10,530,716 B2
(45) Date of Patent: Jan. 7, 2020

(54) VOICE CHAT MODE SELF-ADAPTING METHOD AND APPARATUS

(71) Applicant: TENCENT TECHNOLOGY (SHENZHEN) COMPANY LIMITED, Shenzhen (CN)

(72) Inventors: Liwei Ye, Shenzhen (CN); Tieming Huang, Shenzhen (CN); Yu Chen, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 169 days.

(21) Appl. No.: 15/709,605

(22) Filed: Sep. 20, 2017

(65) Prior Publication Data
US 2018/0006976 A1    Jan. 4, 2018

Related U.S. Application Data (63) Continuation of application No. PCT/CN2016/083404, filed on May 26, 2016.

(30) Foreign Application Priority Data

Jul. 7, 2015    (CN) .......................... 2015 1 0395112

(51) Int. Cl.
*G06F 15/16* (2006.01)
*H04L 12/58* (2006.01)
(Continued)

(52) U.S. Cl.
CPC ............ *H04L 51/043* (2013.01); *H04L 51/36* (2013.01); *H04L 29/08684* (2013.01);
(Continued)

(58) Field of Classification Search
CPC ......... H04L 51/00; H04L 51/04; H04L 51/10; H04L 51/36; H04L 29/08684;
(Continued)

(56) References Cited

U.S. PATENT DOCUMENTS

| 2004/0047303 A1* | 3/2004 | Fernandez ............ H04L 51/066 370/293 |
| 2004/0061718 A1* | 4/2004 | Fitzpatrick .............. H04L 51/04 715/758 |

(Continued)

FOREIGN PATENT DOCUMENTS

| CN | 1606327 A | 4/2005 |
| CN | 1961565 A | 5/2007 |

(Continued)

OTHER PUBLICATIONS

The World Intellectual Property Organization (WIPO) International Search Report for PCT/CN2016/083404 dated Aug. 29, 2016 5 Pages (including translation).

(Continued)

*Primary Examiner* — Liang Che A Wang
*Assistant Examiner* — Johnny B Aguiar
(74) *Attorney, Agent, or Firm* — Anova Law Group, PLLC (57) ABSTRACT

This application discloses a voice chat mode adaptation method and apparatus. The method includes: receiving, by a server, a voice chat request sent by a source client on a chat interface, the voice chat request including information about a corresponding destination client that is on the chat interface; checking whether the destination client of the voice chat request is online; and entering a voice message mode when the destination client is not online, so that the source client and the destination client send a voice message to each other; or entering a real-time chat mode when the destination
(Continued)

client is online, so that the source client and the destination client perform real-time hold-to-talk.

12 Claims, 9 Drawing Sheets

(51) Int. Cl.
  *H04L 29/08* (2006.01)
  *H04M 3/42* (2006.01)
  *H04M 3/533* (2006.01)
(52) U.S. Cl.
  CPC ......... *H04L 67/24* (2013.01); *H04M 3/42365* (2013.01); *H04M 3/533* (2013.01)
(58) Field of Classification Search
  CPC .. H04L 51/043; H04L 67/24; H04M 3/42365; H04M 3/533
  USPC .................. 709/204, 206, 224, 227; 455/413
  See application file for complete search history.

(56) References Cited

U.S. PATENT DOCUMENTS

| | | | | |
|---|---|---|---|---|
| 2004/0160951 | A1* | 8/2004 | Galvin | H04M 3/00 370/352 |
| 2005/0123118 | A1* | 6/2005 | Terry | H04M 3/436 379/211.02 |
| 2007/0282963 | A1 | 12/2007 | Mo et al. | |
| 2008/0205444 | A1* | 8/2008 | Campbell | H04L 12/1831 370/469 |
| 2008/0261630 | A1* | 10/2008 | Wormald | H04M 1/72552 455/466 |
| 2010/0002685 | A1 | 1/2010 | Shaham et al. | |
| 2012/0246226 | A1* | 9/2012 | Anandam | H04L 67/06 709/203 |
| 2015/0040029 | A1* | 2/2015 | Koum | H04L 51/10 715/748 |

FOREIGN PATENT DOCUMENTS

| | | | |
|---|---|---|---|
| CN | 101079835 | A | 11/2007 |
| CN | 102238284 | A | 9/2011 |
| CN | 103384295 | A | 11/2013 |
| CN | 103647867 | A | 3/2014 |
| CN | 105162678 | A | 12/2015 |
| JP | 2010506244 | A | 2/2010 |
| JP | 2013046293 | A | 3/2013 |
| KR | 20060036831 | A | 5/2006 |
| WO | WO-0069143 | A2 * | 11/2000 ............. H04L 29/06 |

OTHER PUBLICATIONS

The State Intellectual Property Office of the People's Republic of China (SIPO) Office Action 1 for 201510395112.6 dated Jun. 5, 2019 7 Pages (including translation).

The Japan Patent Office (JPO) Notification of Reasons for Refusal for Application No. 2017-565104 and Translation dated Nov. 6, 2018 7 Pages (including translation).

Korean Intellectual Property Office (KIPO) Office Action 1 for 20177036138 dated Oct. 8, 2018 11 Pages (including translation).

* cited by examiner

VOICE CHAT MODE SELF-ADAPTING METHOD AND APPARATUS

RELATED APPLICATIONS

This application is a continuation application of PCT Patent Application No. PCT/CN2016/083404, filed on May 26, 2016, which claims priority to Chinese Patent Application No. 201510395112.6, entitled "VOICE CHAT MODE SELF-ADAPTING METHOD AND APPARATUS", filed with the Chinese Patent Office on Jul. 7, 2015, which is incorporated herein by reference in its entirety.

FIELD OF THE TECHNOLOGY

This application relates to the field of network technologies and, in particular, to a voice chat mode self-adapting method and apparatus.

BACKGROUND OF THE DISCLOSURE

The development of the Internet has brought great convenience to people. People can use the Internet to browse information, shop, perform social interaction, or the like. In a chat scenario in which an instant messaging tool is used, when a message sender sends a message, the sender usually prepares the content of the message first (such as editing a text message or recording a voice message), and then sends the message to the other party.

SUMMARY

Embodiments of this application provide a voice chat mode self-adapting method and apparatus.

An embodiment of this application provides a voice-chat-mode self-adapting method implemented by a computing terminal having a processor and a memory. The method includes receiving a voice chat request sent by a source client on a chat interface for a voice chat with a corresponding destination client, the voice chat request including information about the corresponding destination client on the chat interface; when the destination client is not online, entering a voice message mode such that the source client records a voice message and sends the voice message to the destination client; when the destination client is online, entering a real-time chat mode such that the source client and the destination client perform real-time voice chat; checking in real-time an online/offline state of each of the source client and the destination client in the voice chat; and performing automatic switching between the voice message mode and the real-time chat mode according to the online/offline state of each of the source client and the destination client in the voice chat.

An embodiment of this application further provides a voice chat mode self-adapting apparatus. The apparatus includes a memory storing instructions and a processor coupled to the memory. When executing the instructions, the processor is configured for: receiving a voice chat request sent by a source client on a chat interface for a voice chat with a corresponding destination client, the voice chat request including information about the corresponding destination client on the chat interface; when the destination client is not online, entering a voice message mode such that the source client records a voice message and sends the voice message to the destination client; when the destination client is online, entering a real-time chat mode such that the source client and the destination client perform real-time voice chat; checking in real-time an online/offline state of each of the source client and the destination client in the voice chat; and performing automatic switching between the voice message mode and the real-time chat mode according to the online/offline state of each of the source client and the destination client in the voice chat.

An embodiment of this application provides a non-transitory computer-readable storage medium containing computer-executable instructions for, when executed by one or more processors, performing a voice-chat-mode self-adapting method. The method includes receiving a voice chat request sent by a source client on a chat interface for a voice chat with a corresponding destination client, the voice chat request including information about the corresponding destination client on the chat interface; when the destination client is not online, entering a voice message mode such that the source client records a voice message and sends the voice message to the destination client; when the destination client is online, entering a real-time chat mode such that the source client and the destination client perform real-time voice chat; checking in real-time an online/offline state of each of the source client and the destination client in the voice chat; and performing automatic switching between the voice message mode and the real-time chat mode according to the online/offline state of each of the source client and the destination client in the voice chat.

BRIEF DESCRIPTION OF THE DRAWINGS

To describe the technical solutions in the embodiments of this application more clearly, the following briefly describes the accompanying drawings for describing the embodiments.

DESCRIPTION OF EMBODIMENTS

The following further describes this application with reference to the accompanying drawings of the specification and specific embodiments. It should be understood that the specific embodiments described herein are merely used to explain this application, but are not intended to limit this application.

In an existing chat process in which an instant messaging (IM) tool is used, when a sender sends a voice message, regardless of whether a receiver is online, the sender needs to record the voice message and then send the voice message. The receiver completes receiving the voice message, and then plays the voice message. In fact, direct real-time chat can be definitely performed when the receiver is online. Therefore, the existing voice chat manner is not flexible enough, and users cannot communicate effectively.

The embodiments of this application provide a voice-chat-mode self-adapting solution. When client-sides (or clients) perform voice chat, a server can enable the clients to enter a corresponding voice chat mode according to whether the two clients or parties performing the voice chat are online, so that the voice chat is more flexible, and the communication between the clients or friends is more convenient and faster.

The foregoing voice-chat-mode self-adapting solution is applicable to voice messaging performed between instant messaging clients, such as instant messaging tools QQ, WeChat, MOMO, and Laiwang. The clients may be in a form of a web page or a form of an application program.

Figure 1:
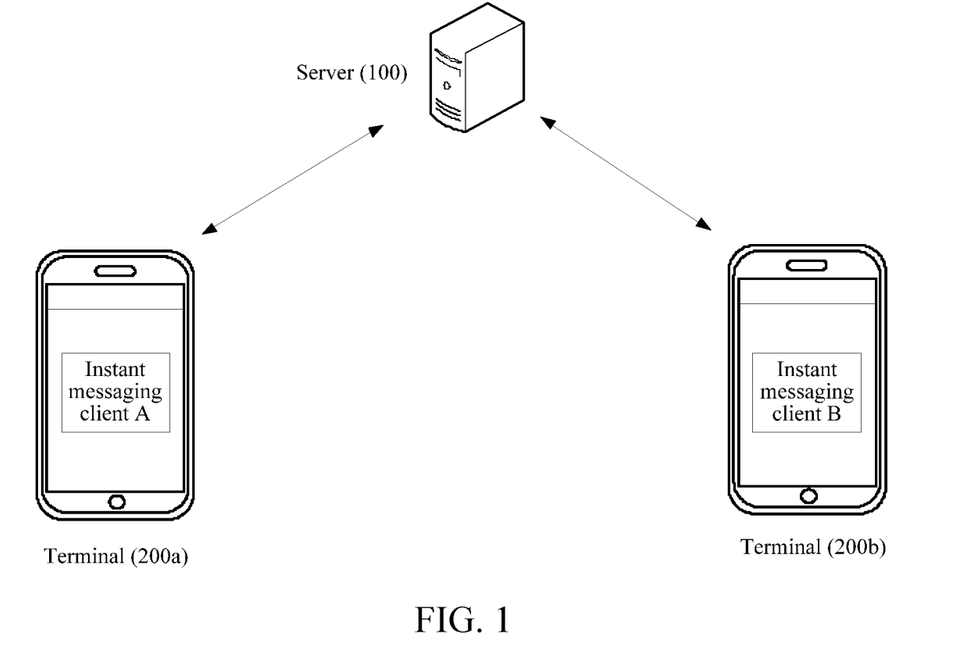
FIG. 1 is a schematic diagram of an interaction structure between a terminal and a server in a voice-chat-mode self-adapting method according to an embodiment of this application.

FIG. 1 is a schematic diagram of an interaction structure between a terminal and a server in a voice-chat-mode self-adapting method according to an embodiment of this application. As shown in FIG. 1, an instant messaging (IM) client A on a terminal 200a and an instant messaging client B on a terminal 200b are friends. The instant messaging client A initiates a voice chat request to the messaging client B by using a server 100.

After receiving the voice chat request, the server 100 checks whether the instant messaging client B is online. When the instant messaging client B is online, the server 100 controls the instant messaging client A and the instant messaging client B to enter a real-time chat mode. When the instant messaging client B is not online, the server 100 controls the instant messaging client A to enter a voice chat mode, so that the instant messaging client A records a voice to generate a voice message. After receiving the voice message uploaded by the instant messaging client A, the server 100 first temporarily stores the voice message in the server 100. After the instant messaging client B enters (for example, logs in) a chat interface, the server 100 automatically sends the voice message to the instant messaging client B.

Therefore, when instant messaging clients need to establish voice messaging, the server 100 enters a corresponding voice chat mode according to whether the two parties performing the voice chat are online, so that the chat manner is more flexible, and communication between friends is more convenient and faster. The server 100 may be a server with a single function, or may be a server cluster that includes multiple servers.

Figure 2:
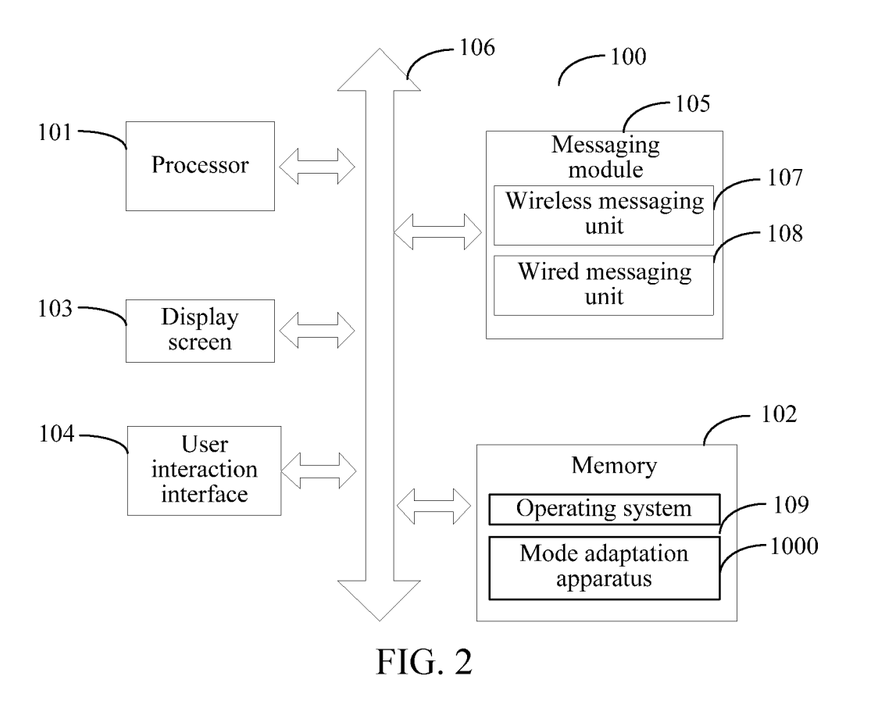
FIG. 2 is a schematic diagram of a hardware architecture of a server to which a voice-chat-mode self-adapting method is applied according to an embodiment of this application.

FIG. 2 is a schematic diagram of a hardware architecture of a server according to an embodiment of this application, and a voice-chat-mode self-adapting method is applied to the server. As shown in FIG. 2, the server 100 may include a processor 101, a memory 102, a display screen 103, a user interaction interface 104, a messaging module 105, and a communications bus 106.

The communications bus 106 is configured for data communication among components in the server 100. The user interaction interface 104 is configured to: receive information entered by a user, and send the information to the processor 101 for processing. The display screen 103 is configured to: receive the information sent by the processor 101, and present the information to the user in a corresponding format such as image display of the display screen or voice display of a speaker. It may be understood that the display screen 103, for example, a touchscreen, may further be configured to receive information entered by the user. The messaging module 105 is configured for messaging between the server 100 and an external device. The external device may include a terminal, a server, or the like. The messaging module 105 may include one or more components, such as a wired messaging unit 108 or a wireless messaging unit 107.

The memory 102 is configured to store an operating system 109 that is run by the server 100, a mode self-adapting apparatus 1000, user interaction data, and the like. The memory 102 may include an internal memory and an external memory, such as a memory card or an external memory card. As a processing center of the server 100, the processor 101 is configured to process data, invoke another component to work, and the like. For example, the processor 101 invokes, according to a request of the user, a corresponding program in the memory 102 for implementation, to implement a function requested by the user.

The memory 102 may include at least one type of non-volatile storage medium. The storage medium includes a flash memory, a hard disk, a multimedia card, a card-typed memory (such as an SD, or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like.

The processor 101 may include a processing unit, an ASIC, a logical unit, a programmable gate array, or the like. For example, the processor 101 is a central processing unit (CPU).

Figure 3:
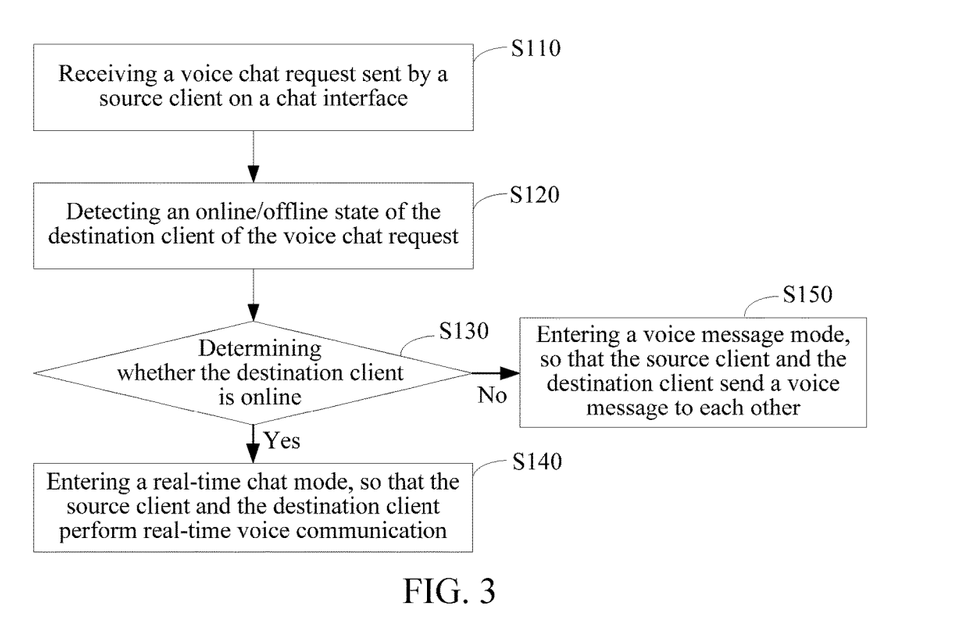
FIG. 3 is a schematic flowchart of a voice-chat-mode self-adapting method according to an embodiment of this application.

FIG. 3 is a schematic flowchart of a voice-chat-mode self-adapting method according to an embodiment of this application. As shown in FIG. 3, based on the mode self-adapting apparatus 1000 that is on the foregoing server 100 (FIG. 2), this application provides a voice-chat-mode self-adapting method. The method may be implemented by, for example, implemented by a computing terminal having a processor and a memory. The voice-chat-mode self-adapting method includes the followings.

S110: Receiving a voice chat request sent by a source client on a chat interface, the voice chat request including information about a corresponding destination client that is on the chat interface.

The source client and the destination client are located on different terminals. Each terminal may be a smartphone, an intelligent telephone, a notebook computer, a desktop computer, a PDA (personal digital assistant), a PAD (tablet computer), a handheld computer, a PMP (portable media player), a wearable device (such as a smart band or a smartwatch), or the like.

Figure 4:
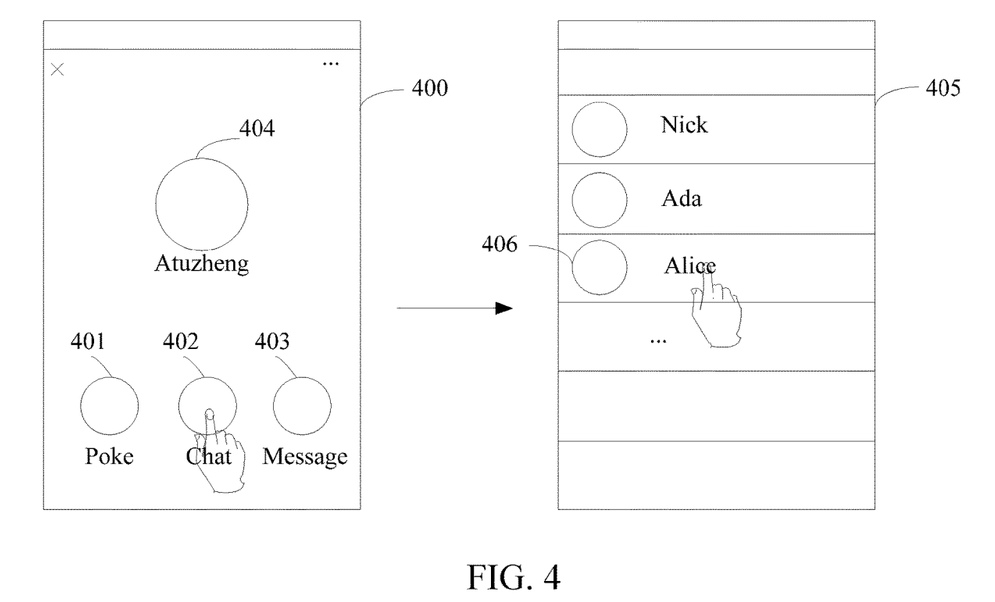
FIG. 4 is an exemplary diagram of a voice chat interface in a voice-chat-mode self-adapting method according to an embodiment of this application.

FIG. 4 is an exemplary diagram of a voice chat interface of a voice-chat-mode self-adapting method according to an embodiment of this application. A user enables an instant messaging client of a terminal, and enters a voice chat interface displayed on the display screen of the terminal. As shown in FIG. 4, displayed on the display screen, the voice chat interface 400 includes several corresponding button-type controls, such as a "poke" button 401, a "chat" button 402, and a "message" button 403, and an avatar (Atuzheng) 404 of a user is displayed. After the user clicks the "chat" button 402, a friend list interface 405 pops up for the user to select one or more friends. After the user selects a friend, for example, Alice 406, the instant messaging client A sends, according to the "chat" button clicked by the user, a voice chat request to Alice by using the server 100.

It may be understood that the friend list interface may be displayed first and the voice chat interface may be displayed afterwards.

Figure 5:
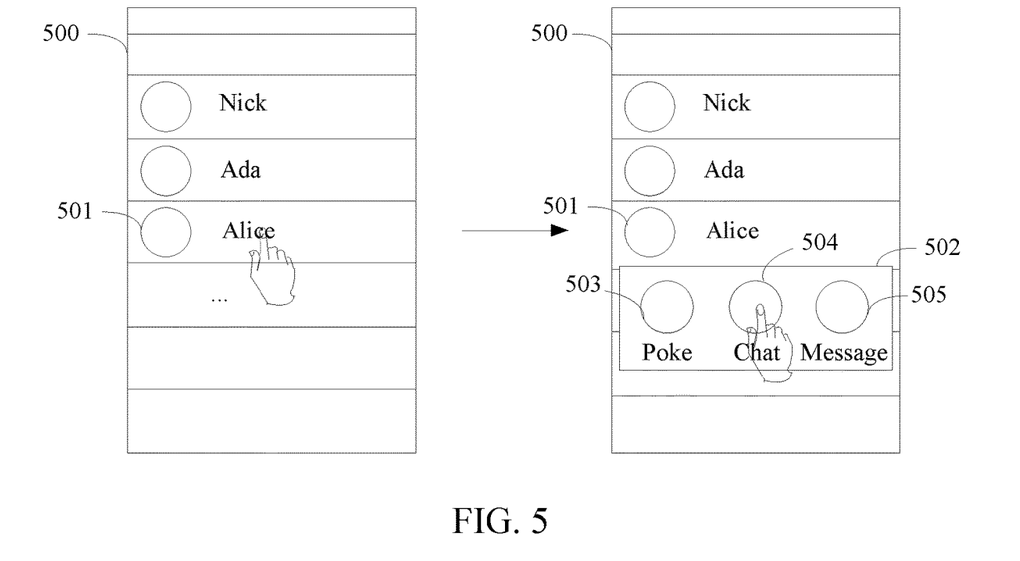
FIG. 5 is an exemplary diagram of an operation of entering a voice chat interface to trigger a voice chat request in a voice-chat-mode self-adapting method according to an embodiment of this application.

FIG. 5 is an exemplary diagram of a voice chat interface of a voice-chat-mode self-adapting method according to an embodiment of this application. As shown in FIG. 5, on a friend list interface 500, if a user wants to perform voice chat with a friend, Alice 501, the user may click the friend. In this case, a control layer 502 pops up. The control layer 502 includes several button-type controls, such as a "poke" button 503, a "chat" button 504, and a "message" button 505. When the "chat" button 504 on the control layer 502 is clicked or triggered, the instant messaging client A sends, according to the click of the user, a voice chat request to Alice by using the server 100.

S120: Detecting an online/offline state of the destination client of the voice chat request.

After receiving the voice chat request sent by the instant messaging client A, the server 100 checks the online/offline state of the destination client of the voice chat request, that is, the online/offline state of the client of the friend Alice. It may be understood that, the server 100 collects and stores the online/offline state of each client in real time, so that the server 100 can check the online/offline state after the server 100 receives the voice chat request.

S130: Determining whether the destination client is online. If the destination client is online, the method proceeds to S140 and, if the destination client is not online, the method proceeds to S150.

S140: Entering a real-time chat mode, so that the source client and the destination client perform real-time voice communication.

That is, when the destination client is online, a real-time chat interface is directly entered, so that the two parties can perform real-time voice chat.

Figure 6:
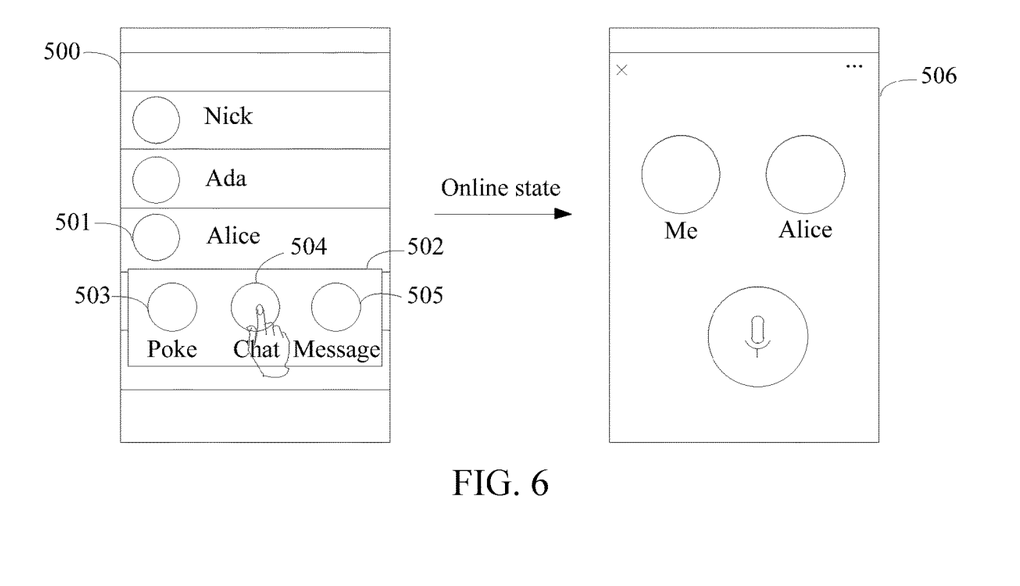
FIG. 6 is an exemplary diagram of an operation when a destination client is online after a voice chat request is triggered in a voice-chat-mode self-adapting method according to an embodiment of this application.

FIG. 6 is an exemplary diagram of operation when a destination client is online after a voice chat request is triggered in a voice-chat-mode self-adapting method according to an embodiment of this application. As shown in FIG. 6, in the real-time chat mode, "me" and "Alice" can perform real-time voice chat. The instant messaging client A displays a real-time chat interface 506, collects (for example, by using a microphone on the terminal on which the instant messaging client A is located) a voice signal sent by "me", and transmits the voice signal to the instant messaging client B in real-time by using the server 100. After receiving the voice signal, the instant messaging client B outputs the voice signal by using a voice output apparatus (such as a speaker) on the terminal on which the instant messaging client B is located. The instant messaging client B collects, for example, by using a microphone on the terminal on which the instant messaging client B is located, a voice signal sent by "Alice", and transmits the voice signal in time to the instant messaging client A by using the server 100. After receiving the voice signal, the instant messaging client A outputs the voice signal by using a voice output apparatus (such as a speaker) on the terminal on which the instant messaging client A is located.

S150: Entering a voice message mode, so that the source client and the destination client send a voice message to each other.

Figure 7:
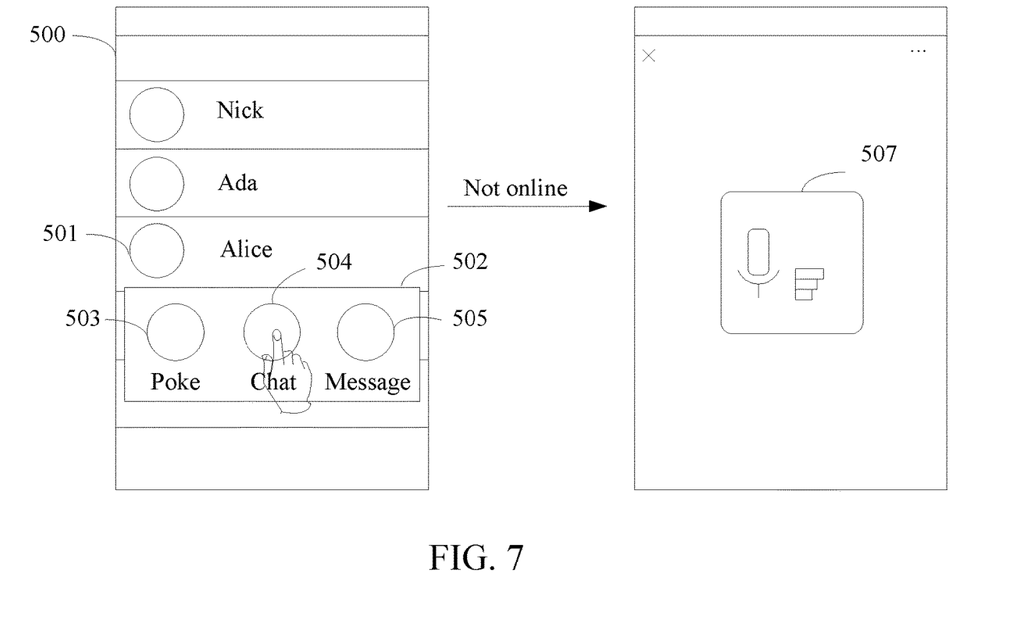
FIG. 7 is an exemplary diagram of an operation when a destination client is not online after a voice chat request is triggered in a voice-chat-mode self-adapting method according to an embodiment of this application.

FIG. 7 is an exemplary diagram of operation when a destination client is not online after a voice chat request is triggered in a voice-chat-mode self-adapting method according to an embodiment of this application. When the destination client (that is, the client of the friend, Alice) is not online, i.e., in an offline state, the voice message mode is entered. The server 100 notifies the instant messaging client A to enter the voice message mode. A voice-recording floating layer 507 pops up on the voice chat interface, to automatically record a voice message in a current environment, and send the voice that is recorded to the server 100, so that the voice message is sent to the destination client by the server 100. A voice signal collection apparatus such as a microphone is set on the terminal on which the messaging client A is located. When voice recording needs to be implemented, the voice signal collection apparatus is automatically enabled, to automatically record a voice.

It may be understood that, the foregoing voice chat request that is sent may further be triggered by touching and holding the "chat" button 504 in FIG. 5. The server 100 determines whether the destination client is online according to the voice chat request. If the destination client is online, the server 100 controls the instant messaging clients to directly enter the real-time chat interface 506. If the destination client is not online, the server 100 controls the instant messaging client, so that the voice-recording floating layer 507 pops up on a current page of the instant messaging client, to automatically record a voice message in the current environment, and send the voice message that is recorded to the server 100, so that the voice message is sent to the destination client by using the server 100, as shown in FIG. 7.

In the embodiment, when a voice chat request is triggered, a voice message mode is entered in default. During operation, a real-time chat mode is switched to when it is determined that a destination client is online, and the voice message mode is directly entered when it is determined that the destination client is not online.

In the embodiment of this application, when clients perform voice chat, a server can enable clients to enter a corresponding voice chat mode according to whether the two parties performing the voice chat are online, so that the chat manner is more flexible, and communication between friends is more convenient and faster.

Figure 8:
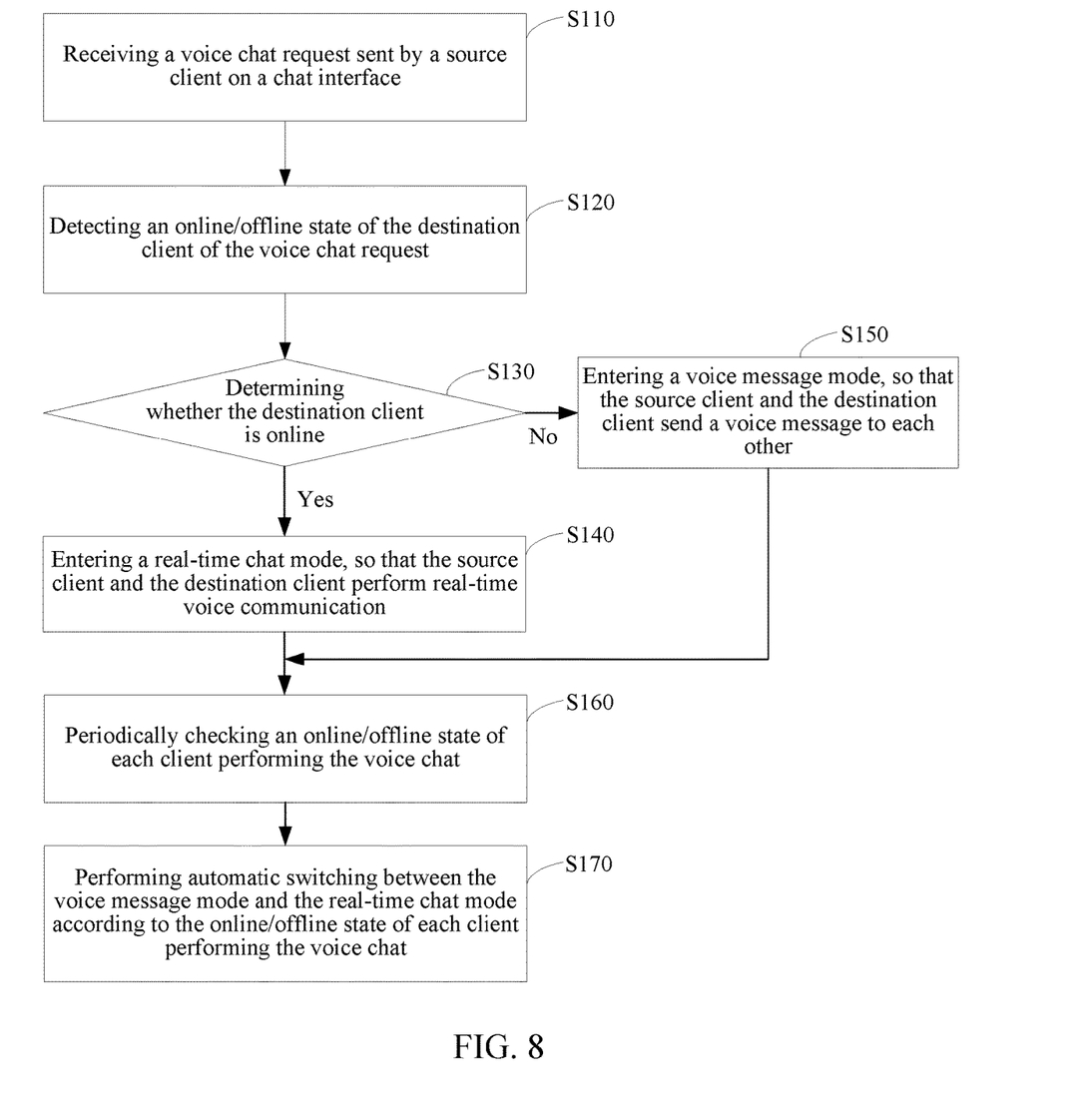
FIG. 8 is a schematic flowchart of a voice-chat-mode self-adapting method according to an embodiment of this application.

Further, based on the foregoing embodiment, another voice-chat-mode self-adapting method in this application is provided. FIG. 8 is a schematic flowchart of a voice-chat-mode self-adapting method according to an embodiment of this application. As shown in FIG. 8, in the embodiment, after the foregoing S140 or S150, the method further includes the followings.

S160: Periodically checking an online/offline state of each client performing the voice chat.

After a voice chat is established between the source client and the destination client, the server 100 periodically checks an online/offline state of each party.

S170: Performing automatic switching between the voice message mode and the real-time chat mode according to the online/offline state of each client performing the voice chat.

During the voice chat, when the source client sends a voice message to the destination client, if the server 100 finds that the destination client is in an online state, the server 100 sends the voice message to the destination client. When the source client further sends a voice message, the real-time chat mode is automatically switched to. When the source client and the destination client perform real-time chat, if the server 100 finds that the source client or the destination client is not online, the voice chat mode is automatically switched to.

Thus, voice-chat-mode self-adapting is performed when a voice chat request is triggered. In addition, after a corresponding voice chat mode is entered, a corresponding voice chat mode is switched to in real-time according to the online/offline states of two parties.

Further, the server 100 updates the online/offline state of each client. That is, the server 100 receives and stores the online/offline state reported by each client. Specifically, the server 100 receives a heartbeat packet automatically reported by the client on the chat interface, and the so-called heartbeat packet is simple information regularly sent by a client to a server for notifying the server whether the client is online. The heartbeat packet may include, for example, an online heartbeat packet and an offline heartbeat packet. When a preset number of consecutive online heartbeat packets reported by the client are received, the server may determine that the client is in an online state, and stores the online state for the client; when the received heartbeat packet reported by the client is an offline heartbeat packet, the server may determine that the client is in an offline state, and stores the offline state for the client.

According to the embodiment of this application, a format of the heartbeat packet may include: a room identifier (roomid), a unique self-identifier id, and an online/offline identifier (OnlineFlag). The room identifier is an identifier of a chat room that is created for two parties performing chat, which is used to bind the two parties performing the chat. As shown in the following Table 1:

| Room identifier | Roomid | Longlong |
| --- | --- | --- |
| Unique self-identifier | Id | Long |
| Online/offline identifier | OnlineFlag | Bool |

According to the embodiment of this application, for an online/offline identifier, it is set in such a manner that when a Bool value is 1, it indicates an online identifier (an online state), or when a Bool value is 0, it indicates an offline identifier (an offline state). When an instant messaging client enters a chat interface, the instant messaging client sends an online heartbeat packet to the server at preset intervals (such as 2 s). A format of content that is sent includes: a room identifier (roomid), a unique self-identifier id (the client), and an online/offline identifier (1). When the instant messaging client withdraws from the chat interface, the instant messaging client sends an offline heartbeat packet. A format of content that is sent includes: a room identifier (roomid), a unique self-identifier id, and an online/offline identifier (0).

After receiving the heartbeat packet reported by the client, the server 100 determines whether the instant messaging client is online according to the heartbeat packets. When an online/offline identifier in the heartbeat packet is 0, it is determined that the instant messaging client is in an offline state. When the online/offline identifier in the heartbeat packet is 1, it is determined that each instant messaging client is in an online state. If online/offline identifiers of a preset number (such as five) of consecutive heartbeat packets received by the server 100 are 1, it is determined that the instant messaging client is in a stable online state. It may be understood that, if the server 100 does not receive, within a preset time period (such as 10 s), any heartbeat packet reported by the client, it is determined that the instant messaging client is in an offline state.

The server 100 updates an online/offline state of each client by receiving a heartbeat packet uploaded by each client, so that the server 100 can enter a corresponding voice chat mode according to the online/offline state of the destination client when the source client initiates a voice chat request.

Further, the server 100 may further establish real-time state information between friends according to room identifier roomid. A format of the state information is shown in the following Table 2:

| Room identifier | Roomid | Longlong |
| --- | --- | --- |
| Online/offline identifier | OnlineFlag | Bool |
| Unique counterpart identifier (for verification) | Pariuuid | Long |

After receiving a heartbeat packet reported by the instant messaging client A, the server 100 searches, according to Table 2, for a unique counterpart identifier (that is, Pariuuid) that corresponds to a roomid A, and checks whether both the instant messaging client A and the instant messaging client B are online according to heartbeat packets reported by the instant messaging client A and the instant messaging client B. The "Online/offline identifier" may be set based on the online/offline state of the clients.

Figure 9:
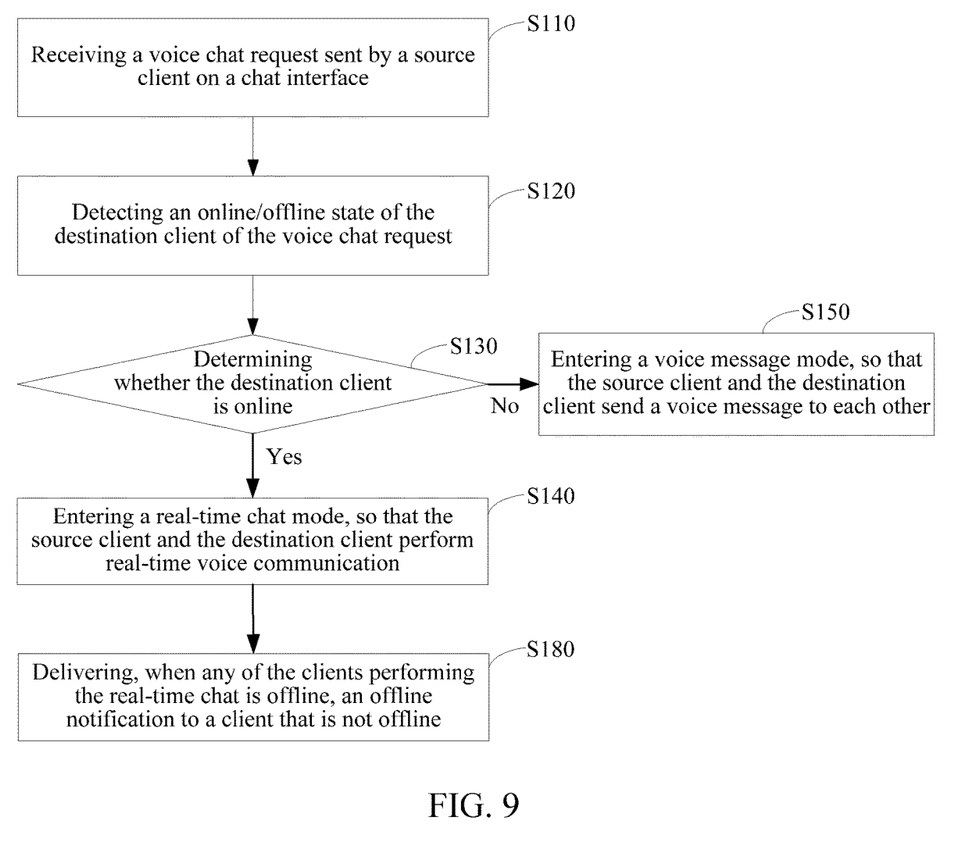
FIG. 9 is a schematic flowchart of a voice-chat-mode self-adapting method according to an embodiment of this application.

Further, FIG. 9 is a schematic flowchart of a voice-chat-mode self-adapting method according to an embodiment of this application. As shown in FIG. 9, after the foregoing S140, the method further includes the followings.

S180: Delivering, when any of the clients performing the real-time chat is offline, an offline notification to a client that is not offline.

After entering the real-time chat mode, the server 100 further checks online/offline states of the two parties. If the two parties maintain an online state, the real-time chat mode may be maintained. If either of the two parties is in an offline state, the voice message mode is automatically switched to, and an offline notification is delivered to a client that is not offline.

It may be understood that, when both the source client and the destination client are online, the server 100 further sends the online state to the other client. For example, the server 100 sends the online state of the destination client to the source client, and sends the online state of the source client to the destination client. In addition, after the client receives the online state sent by the server, the server stores the state.

Figure 10:
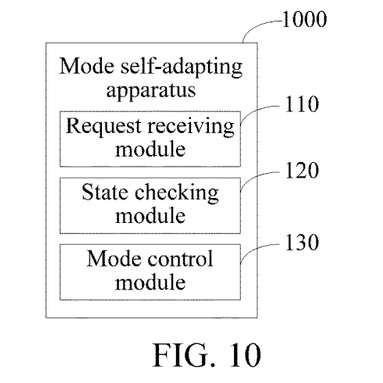
FIG. 10 is a schematic diagram of a functional module of a voice-chat-mode self-adapting apparatus according to an embodiment of this application.

Correspondingly, FIG. 10 is a schematic diagram of a functional module of a voice-chat-mode self-adapting apparatus according to an embodiment of this application. As shown in FIG. 10, the voice-chat-mode self-adapting apparatus in the embodiment may include:

a request receiving module 110, a state checking module 120, and a mode control module 130.

The request receiving module 110 is configured to receive a voice chat request sent by a source client on a chat interface, the voice chat request including information about a corresponding destination client that is on the chat interface.

The state checking module 120 is configured to determine whether the destination client of the voice chat request is online. The mode control module 130 is configured to: enter a voice message mode when the destination client is not online, so that the source client and the destination client send a voice message to each other; or enter a real-time chat mode when the destination client is online, so that the source client and the destination client perform real-time voice chat.

The request receiving module 110 receives a voice chat request sent by a client. The voice chat request is generated after the client is triggered by a user. The client is on a terminal. The terminal may be a PC, a smartphone, a notebook computer, a tablet computer, a handheld computer, or the like. Using an instant messaging client as an example, a user enables an instant messaging client of the terminal and enters a voice chat interface. As shown in FIG. 4, the voice chat interface 400 includes several corresponding button-type controls, such as a "poke" button 401, a "chat" button 402, and a "message" button 403, and an avatar (Atuzheng) 404 of the user is displayed. After the user clicks the "chat" button 402, a friend list interface 405 pops up for the user to select a friend to chat with. After the user selects a friend, Alice 406, the instant messaging client A sends, according to the triggering of the user, a voice chat request to Alice by using the server 100.

It may be understood that the voice chat interface may instead display the friend list interface first, as shown in FIG. 5. On a friend list interface 500, if the user wants to perform voice chat with a friend, Alice 501, the user may click the friend. In this case, a control layer 502 pops up. The control layer 502 includes several button-type controls, such as a "poke" button 503, a "chat" button 504, and a "message" button 505. When the "chat" button 504 on the control layer 502 is triggered, the instant messaging client A sends, according to the triggering of the user, a voice chat request to Alice by using the server 100.

After receiving the voice chat request sent by the instant messaging client A, the state checking module 120 checks an online/offline state of a destination client of the voice chat request, that is, an online/offline state of the client of the friend Alice. It may be understood that, the server 100 collects and stores an online/offline state of each client in real time, so that the server 100 can check the online/offline state after the server 100 receives the voice chat request.

When the destination client is online, the mode control module 130 controls the instant messaging clients to directly enter a chat interface, so that the two parties can perform real-time chat, as shown in FIG. 6. In the real-time chat mode, "me" and "Alice" can perform real-time voice chat. The instant messaging client A displays a real-time chat interface 506, collects (for example, by using a microphone on the terminal on which the instant messaging client A is located) a voice signal sent by "me", and transmits the voice signal to the instant messaging client B in time by using the server 100. After receiving the voice signal, the instant messaging client B outputs the voice signal by using a voice output apparatus (such as a speaker) on the terminal on which the instant messaging client B is located. The instant messaging client B collects, for example, by using a microphone on the terminal on which the instant messaging client B is located, a voice signal sent by "Alice", and transmits the voice signal in time to the instant messaging client A by using the server 100. After receiving the voice signal, the instant messaging client A outputs the voice signal by using a voice output apparatus (such as a speaker) on the terminal on which the instant messaging client A is located.

When a destination client (that is, the client of the friend, Alice) is not online, the mode control module 130 controls the instant messaging client to enter the voice message mode. The server 100 notifies the instant messaging client A to enter the voice message mode. A voice-recording floating layer 507 pops up on the voice chat interface, to automatically record a voice in the current environment, and send the voice that is recorded to the server 100, so that the voice is sent to the destination client by the server 100. A voice signal collection apparatus such as a microphone is set on the terminal. When voice recording needs to be implemented, the voice signal collection apparatus is automatically enabled, to automatically record a voice.

Thus, when clients perform voice chat, a server can enable clients to enter a corresponding voice chat mode according to whether the two parties performing the voice chat are online, so that the chat manner is more flexible, and communication between friends is more convenient and faster.

Further, the state checking module 120 is further configured to check, in real time, an online/offline state of each client performing the voice chat.

The mode control module 130 is further configured to perform automatic switching between the voice message mode and the real-time chat mode according to the online/offline state of each client performing the voice chat.

Specifically, during the voice chat, after a voice chat is established between the source client and the destination client, the state checking module 120 periodically checks an online/offline state of each party. When the source client sends a voice message to the destination client, if the state checking module 120 finds that the destination client is in an online state, the mode control module 130 sends the voice message to the destination client. When the source client further sends a voice message, the mode control module 130 automatically switches to the real-time chat mode. When the source client and the destination client perform real-time chat, if the state checking module 120 finds that the source client or the destination client is not online, the mode control module 130 automatically switches to the voice chat mode.

In the embodiment, voice-chat-mode self-adapting is performed when a voice chat request is triggered. In addition, after a corresponding voice chat mode is entered, a corresponding voice chat mode is switched to in time according to online/offline states of two parties. In this way, the chat manner is relatively flexible.

Figure 11:
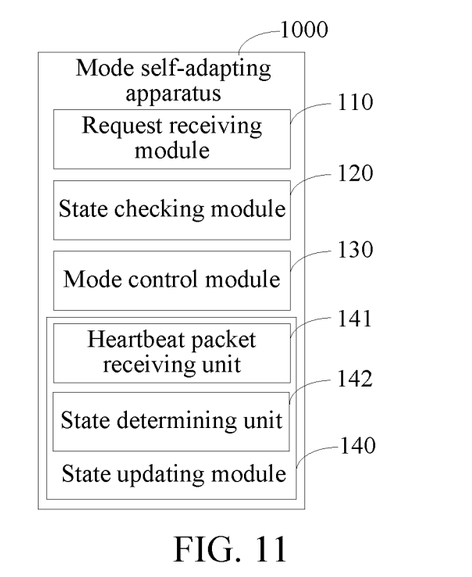
FIG. 11 is a schematic diagram of a functional module of a voice-chat-mode self-adapting apparatus according to an embodiment of this application.

Further, FIG. 11 is a schematic diagram of a functional module of a voice-chat-mode self-adapting apparatus according to an embodiment of this application. As shown in FIG. 11, the foregoing voice-chat-mode self-adapting apparatus may further include: a state updating module 140.

The state updating module 140 is configured to receive an online/offline state reported by each client, and store the online/offline state. Specifically, the state updating module 140 includes: a heartbeat packet receiving unit 141 and a state determining unit 142.

The heartbeat packet receiving unit 141 is configured to receive a heartbeat packet automatically reported by the client on the chat interface, the heartbeat packet including an online heartbeat packet and an offline heartbeat packet.

The state determining unit 142 is configured to: when a preset number of consecutive online heartbeat packets reported by the client are received, determine that the client is in an online state, and store the online state; or when the received heartbeat packet reported by the client is an offline heartbeat packet, determine that the client is in an offline state, and store the offline state.

According to the embodiment of this application, a format of the foregoing heartbeat packet includes: a room identifier (roomid), a unique self-identifier id, and an online/offline identifier (OnlineFlag). The room identifier is an identifier of a chat room that is created for two parties performing chat, which is used to bond the two parties performing the chat. As shown in the following Table 3:

| Room identifier | Roomid | Longlong |
| --- | --- | --- |
| Unique self-identifier | Id | Long |
| Online/offline identifier | OnlineFlag | Bool |

According to the embodiment of this application, for an online/offline identifier, it is set in such a manner that when a Bool value is 1, it indicates an online identifier, or when a Bool value is 0, it indicates an offline identifier. When an instant messaging client enters a chat interface, the instant messaging client sends an online heartbeat packet to the server at preset intervals (such as 2 s). A format of content that is sent includes: a room identifier (roomid), a unique self-identifier id, and an online/offline identifier (1). When the instant messaging client withdraws from the chat interface, the instant messaging client sends an offline heartbeat packet. A format of content that is sent includes: a room identifier (roomid), a unique self-identifier id, and an online/offline identifier (0).

After receiving the heartbeat packet reported by the client, the server 100 determines whether the instant messaging client is online according to the heartbeat packet. When an online/offline identifier in the heartbeat packet is 0, it is determined that the instant messaging client is in an offline state. When the online/offline identifier in the heartbeat packet is 1, it is determined that the instant messaging client is in an online state. If online/offline identifiers of a preset quantity (such as five) of consecutive heartbeat packets that are received by the server 100 are 1, it is determined that the instant messaging client is in a stable online state. It may be understood that, if the server 100 does not receive, within a preset time period (such as 10 s), any heartbeat packet reported by the client, it is determined that the instant messaging client is in an offline state.

The server 100 updates an online/offline state of each client by receiving a heartbeat packet uploaded by each client, so that the server 100 can enter a corresponding voice chat mode according to an online/offline state of a destination client when the client initiates a voice chat request.

Further, the state updating module 140 may further establish real-time state information between friends according to room identifier roomid. A format of the information is shown in the following Table 4:

| Room identifier | Roomid | Longlong |
| --- | --- | --- |
| Online/offline identifier | OnlineFlag | Bool |
| Unique counterpart identifier (for rectification) | Pariuuid | Long |

After receiving a heartbeat packet reported by the instant messaging client A, the server 100 searches, according to Table 4, for a unique counterpart identifier (that is, Pariuuid) that corresponds to a roomid A, and checks whether both the instant messaging client A and the instant messaging client B are online according to heartbeat packets reported by the instant messaging client A and the instant messaging client B.

Figure 12:
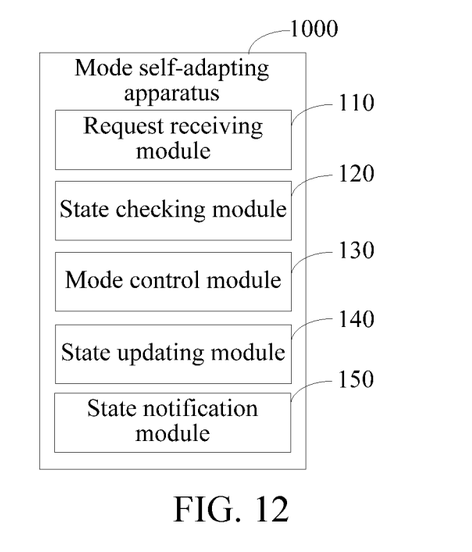
FIG. 12 is a schematic diagram of a functional module of a voice-chat-mode self-adapting apparatus according to an embodiment of this application.

Further, FIG. 12 is a schematic diagram of a functional module of a voice-chat-mode self-adapting apparatus according to an embodiment of this application. As shown in FIG. 12, the foregoing voice-chat-mode self-adapting apparatus further includes: a state notification module 150, configured to deliver, when any of the clients performing the real-time chat is offline, an offline notification to a client that is not offline.

After entering the real-time chat mode, the state checking module 120 further checks online/offline states of the two parties. If the two parties maintain an online state, the real-time chat mode may be maintained. If either of the two parties is in an offline state, the mode control module 130 automatically switches to the voice message mode, and the state notification module 150 delivers an offline notification to a client that is not offline.

It may be understood that, when both the source client and the destination client are online, the state notification module 150 further sends the online state to the other client. For example, the server 100 sends the online state of the destination client to the source client, and sends the online state of the source client to the destination client. In addition, after the client receives the online state sent by the server, the server stores the state.

The mode self-adapting apparatuses in FIG. 10 to FIG. 12 may be, for example, the mode self-adapting apparatus 1000 shown in FIG. 2, and the modules in the mode self-adapting apparatuses may be the instruction module that can be processed by the processor 101.

Figure 13:
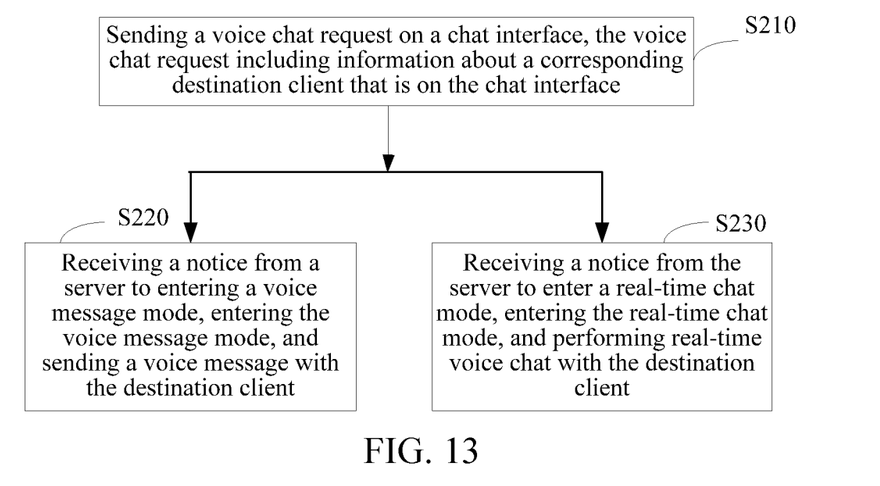
FIG. 13 is a schematic flowchart of a voice-chat-mode self-adapting method according to an embodiment of this application.

FIG. 13 is a schematic flowchart of a voice-chat-mode self-adapting method according to an embodiment of this application. The voice-chat-mode self-adapting method is applied to a source client, and includes the followings.

S210: Sending a voice chat request on a chat interface, the voice chat request including information about a corresponding destination client that is on the chat interface.

S220: Receiving a notice from a server to entering a voice message mode when it is determined that the destination client is not online, entering the voice message mode, and sending a voice message with the destination client.

S230: Receiving a notice from the server to enter a real-time chat mode when it is determined that the destination client is online, entering the real-time chat mode, and performing real-time voice chat with the destination client.

Figure 14:
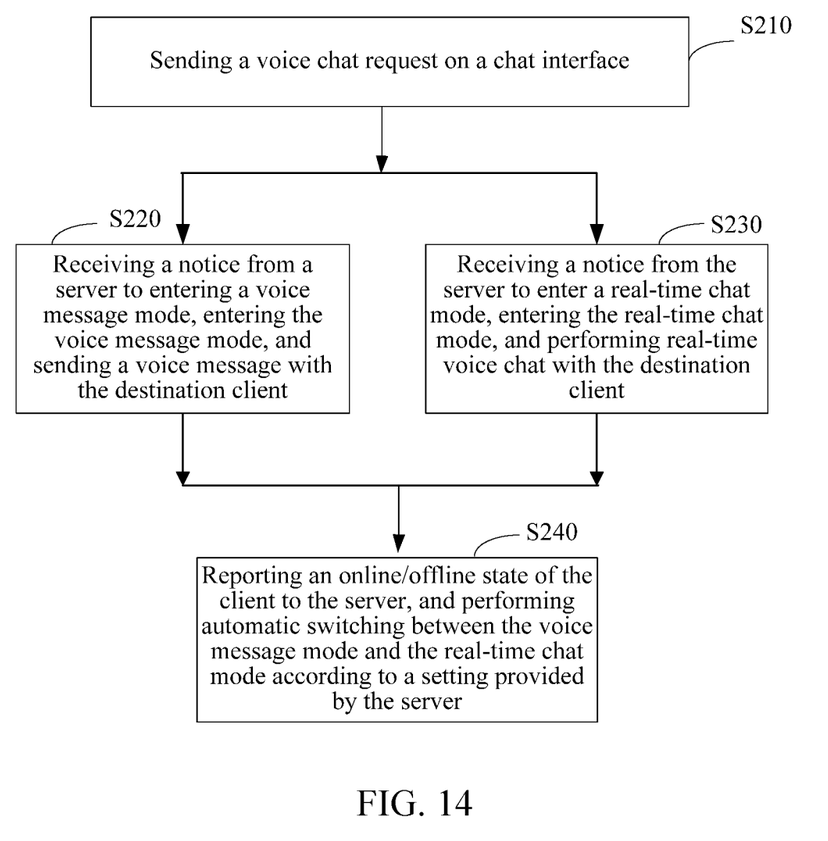
FIG. 14 is a schematic flowchart of a voice-chat-mode self-adapting method according to an embodiment of this application.

FIG. 14 is a schematic flowchart of another voice-chat-mode self-adapting method according to an embodiment of this application.

Based on FIG. 13, after the client enters a voice message mode or a real-time chat mode, the voice-chat-mode self-adapting method further includes:

S240: Reporting an online/offline state of the client to the server, and performing automatic switching between the voice message mode and the real-time chat mode according to a setting provided by the server.

Specifically, for reporting the online/offline state of the client to the server, the client automatically sends a heartbeat packet after entering the chat interface, the heartbeat packet including an online heartbeat packet and an offline heartbeat packet, where when a preset number of consecutive online heartbeat packets are reported, it indicates that the reporting client is in an online state; or when the reported heartbeat packet is an offline heartbeat packet, it indicates that the reporting client is in an offline state.

Figure 15:
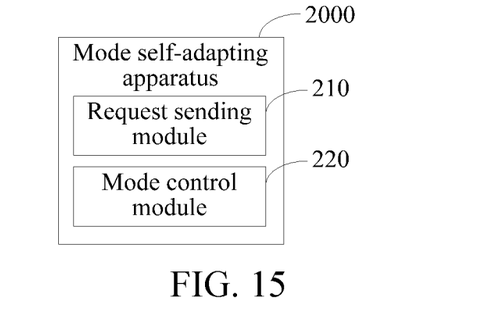
FIG. 15 is a schematic diagram of a functional module of a voice-chat-mode self-adapting apparatus according to an embodiment of this application.

FIG. 15 is a schematic diagram of a functional module of a voice-chat-mode self-adapting apparatus according to an embodiment of this application. The voice-chat-mode self-adapting apparatus 2000 is applied to a source client, and may include the following modules: a request sending module 210 and a mode control module 220.

The request sending module 210 is configured to send a voice chat request on a chat interface, the voice chat request including information about a corresponding destination client that is on the chat interface.

The mode control module 220 is configured to: when the destination client is not online, receive a notice from a server for entering a voice message mode, enter the voice message mode, and send a voice message with the destination client; or when the destination client is online, receive a notice from the server for entering a real-time chat mode, enter the real-time chat mode, and perform real-time voice chat with the destination client.

Figure 16:
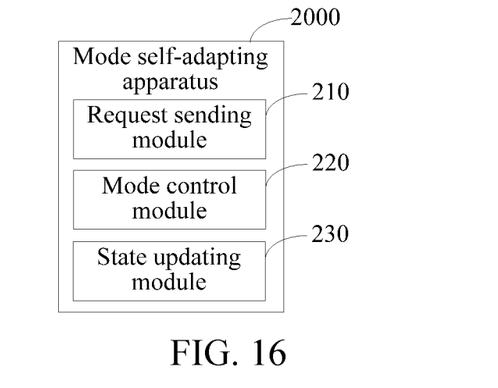
FIG. 16 is a schematic diagram of a functional module of a voice-chat-mode self-adapting apparatus according to an embodiment of this application.

FIG. 16 is a schematic structural diagram of another voice-chat-mode self-adapting apparatus according to an embodiment of this application.

Based on FIG. 15, the voice-chat-mode self-adapting apparatus 2000 further includes a state updating module 230, configured to report an online/offline state of a source client to a server.

Specifically, the state updating module 230 is configured to automatically send a heartbeat packet after entering the chat interface, the heartbeat packet including an online heartbeat packet and an offline heartbeat packet, where when a preset number of consecutive online heartbeat packets are reported, it indicates that the reporting client is in an online state; or when the reported heartbeat packet is an offline heartbeat packet, it indicates that the reporting client is in an offline state.

The voice-chat-mode self-adapting apparatuses 2000 in FIG. 13 to FIG. 16 are located on a terminal device. The terminal device may be a fixed terminal or a mobile terminal, such as a smartphone, an intelligent telephone, a notebook computer, a desktop computer, a PDA (personal digital assistant), a PAD (tablet computer), a handheld computer, a PMP (portable media player), a wearable device (such as a smart band or a smartwatch), or the like. The modules in the mode self-adapting apparatus 2000 may be, for example, the instruction module that can be processed by the processor.

It may be clear according to the descriptions of the foregoing examples that, this application may be implemented by hardware, or may be implemented by software in addition to a necessary universal hardware platform. Based on such an understanding, the technical solutions in this application may be implemented in a form of a software product. The software product may be stored in a nonvolatile storage medium, and includes several instructions for instructing a computer device (which may be a personal computer, a server, a network device, or the like) to perform the method described in each embodiment of this application.

In the foregoing embodiments, an example of two clients is used for description. However, the method in the embodiment of this application is also applicable to a scenario in which a user initiates a chat request to multiple clients.

The foregoing descriptions are merely embodiments of this application and are not intended to limit the patent scope of this application. Any equivalent modifications made to the structures or processes based on the content of the specification and the accompanying drawings of this application for direct or indirect use in other relevant technical fields shall also be encompassed in the patent protection scope of this application.

What is claimed is:

1. A voice-chat-mode self-adapting method implemented by a computing terminal having a processor and a memory, the method comprising:
   receiving a voice chat request instructed by a source client for a voice chat via a chat interface of an electronic device with a destination client;
   monitoring sending of any heartbeat packet instructed by the source client and the destination client within a preset time period;
   upon confirmation within the preset time period on sending of a preset number of online heartbeat packets, recording, as being of online, at least one of the source and destination clients corresponding to the sending of the preset number of online heartbeat packets;
   upon confirmation within the preset time period on non-sending of the preset number of online heartbeat packets, recording, as being of offline, at least one of the source and destination clients corresponding to the non-sending of the preset number of online heartbeat packets;
   when the destination client is offline, effecting a voice message mode at which the source client records a voice message to be sent to the destination client;
   when the destination client is online, effecting a real-time chat mode at which the source client and the destination client perform a real-time voice chat;
   when one of the source and destination clients in the real-time voice chat becomes offline, delivering an offline notification to the other of the source and destination clients, the other of the source and destination clients being still online; and
   switching the voice chat from the real-time chat mode to the voice message mode when either of the source and destination clients becomes offline from being previously online in the voice chat.

2. The voice-chat-mode self-adapting method according to claim 1,
   wherein the non-sending of the preset number of online heartbeat packets includes sending of an offline heartbeat packet.

3. The voice-chat-mode self-adapting method according to claim 1, wherein, when the voice message mode is effected, the chat interface automatically displays a voice recorder to record the voice message to be sent to the destination client.

4. The voice-chat-mode self-adapting method according to claim 1, wherein monitoring sending of any heartbeat packet instructed by the destination client is performed prior to receiving the voice chat request.

5. A voice-chat-mode self-adapting apparatus, comprising:
   a memory storing instructions; and
   a processor coupled to the memory and, when executing the instructions, configured for:

receiving a voice chat request instructed by a source client for a voice chat via a chat interface of an electronic device with a destination client;

monitoring sending of any heartbeat packet instructed by the source client and the destination client within a preset time period;

upon confirmation within the preset time period on sending of a preset number of online heartbeat packets, recording, as being online, at least one of the source and destination clients corresponding to the sending of the preset number of online heartbeat packets;

upon confirmation within the preset time period on non-sending of the preset number of online heartbeat packets, recording, as being offline, at least one of the source and destination clients corresponding to the non-sending of the preset number of online heartbeat packets;

when the destination client is offline, effecting a voice message mode at which the source client records a voice message to be sent to the destination client;

when the destination client is online, effecting a real-time chat mode at which the source client and the destination client perform a real-time voice chat;

when one of the source and destination clients in the real-time voice chat becomes offline, delivering an offline notification to the other of the source and destination clients, the other of the source and destination clients being still online; and switching voice chat from the real-time chat mode to the voice message mode when either of the source and destination clients becomes offline from being previously online in the voice chat.

6. The voice-chat-mode self-adapting apparatus according to claim 5,
wherein the non-sending of the preset number of online heartbeat packets includes sending of an offline heartbeat packet.

7. The voice-chat-mode self-adapting apparatus according to claim 5, wherein, when the voice message mode is effected, the chat interface automatically displays a voice recorder to record the voice message to be sent to the destination client.

8. The voice-chat-mode self-adapting apparatus according to claim 5, wherein monitoring sending of any heartbeat packet instructed by the destination client is performed prior to receiving the voice chat request.

9. A non-transitory computer-readable storage medium containing computer-executable instructions for, when executed by one or more processors, performing a voice-chat-mode self-adapting method, the method comprising:

receiving a voice chat request instructed by a source client for a voice chat via a chat interface of an electronic device with a destination client;

monitoring sending of any heartbeat packet instructed by the source client and the destination client within a preset time period;

upon confirmation within the preset time period on sending of a preset number of online heartbeat packets, recording, as being online, at least one of the source and destination clients corresponding to the sending of the preset number of online heartbeat packets;

upon confirmation within the preset time period on non-sending of the preset number of online heartbeat packets, recording, as being offline, at least one of the source and destination clients corresponding to the non-sending of the preset number of online heartbeat packets;

when the destination client is offline, effecting a voice message mode at which the source client records a voice message to be sent to the destination client;

when the destination client is online, effecting a real-time chat mode at which the source client and the destination client perform a real-time voice chat;

when one of the source and destination clients in the real-time voice chat becomes offline, delivering an offline notification to the other of the source and destination clients, the other of the source and destination clients being still online; and switching the voice chat from the real-time chat mode to the voice message mode when either of the source and destination clients becomes offline from being previously online in the voice chat.

10. The non-transitory computer-readable storage medium according to claim 9,
wherein the non-sending of the preset number of online heartbeat packets includes sending of an offline heartbeat packet.

11. The non-transitory computer-readable storage medium according to claim 9, wherein, when the voice message mode is effected, the chat interface automatically displays a voice recorder to record the voice message to be sent to the destination client.

12. The non-transitory computer-readable storage medium according to claim 9, wherein monitoring sending of any heartbeat packet instructed by the destination client is performed prior to receiving the voice chat request.

* * * * *